United States Patent
Takahashi et al.

[11] Patent Number: 5,887,697
[45] Date of Patent: Mar. 30, 1999

[54] COIN DISCRIMINATING APPARATUS

[75] Inventors: Masataka Takahashi, Matsudo; Keiji Tsuji, Chiba-ken, both of Japan

[73] Assignee: Laurel Bank Machines Co., Ltd., Tokyo, Japan

[21] Appl. No.: 820,414

[22] Filed: Mar. 12, 1997

[30] Foreign Application Priority Data

Mar. 29, 1996 [JP] Japan ................................ 8-077521
Feb. 25, 1997 [JP] Japan ................................ 9-040662

[51] Int. Cl.⁶ .............................................. G07D 5/02
[52] U.S. Cl. ........................................ 194/317; 194/334
[58] Field of Search ................................ 194/317, 328, 194/331, 334, 335

[56] References Cited

U.S. PATENT DOCUMENTS 5,494,147  2/1996  Takahashi et al. ...................... 194/328
5,515,960  5/1996  Wood ...................................... 194/328

FOREIGN PATENT DOCUMENTS 5-46840   2/1993  Japan ...................................... 194/328
7-110875  4/1995  Japan .
7-110875  5/1995  Japan .

*Primary Examiner*—F. J. Bartuska
*Attorney, Agent, or Firm*—Frishauf, Holtz, Goodman, Langer & Chick, P.C.

[57] ABSTRACT

A coin discriminating apparatus includes a plurality of light emitting elements for projecting light onto a coin, a light receiver for optically detecting light reflected by the coin, and a scattering member, disposed on an opposite side of the coin from a light receiver, for scattering light emitted from the plurality of light emitting elements. The light receiver receives light reflected by the coin and light scattered by the scattering member and produces pattern data. The coin discriminating apparatus further includes a coin discriminator for detecting a diameter of the coin based on the pattern data produced by the light receiver, tentatively determining a denomination of the coin, and comparing the pattern data of the coin produced by the light receiver with reference pattern data of a coin of the tentatively determined denomination. It is therefore possible to discriminate coins with high accuracy by optically detecting the pattern of obverse or reverse surfaces of the coins, even if dust and the like adhere to the side surfaces of the coins.

12 Claims, 9 Drawing Sheets

COIN DISCRIMINATING APPARATUS

BACKGROUND OF THE INVENTION

The present invention relates to a coin discriminating apparatus and, in particular, to a coin discriminating apparatus for discriminating coins by optically detecting patterns of the lower surfaces thereof.

DESCRIPTION OF THE PRIOR ART

U.S. Pat. No. 5,494,147 discloses a coin discriminating apparatus for discriminating the denomination of a coin, its genuineness and whether or not it is a foreign coin by the steps of mapping pattern data produced by optically detecting an obverse or reverse surface of a coin in an x-y coordinate system, tentatively determining a coin denomination based on the diameter of the coin, transforming the pattern data into a polar coordinate system, and comparing the transformed pattern data with reference data of a coin of the tentatively determined denomination.

However, since the coin discriminating apparatus disclosed in U.S. Pat. No. 5,494,147 discriminates a coin by mapping pattern data produced by optically detecting an obverse or reverse surface of a coin in an x-y coordinate system, tentatively determining its denomination based on the diameter of the coin, and comparing the pattern data with reference data of a coin of the tentatively determined denomination, in the case where dust such as metal powders produced by wearing the coin due to long use adheres to the side surface of the coin, the tentatively determined denomination may be erroneous, and there is some risk of genuine coins being discriminated to be unacceptable coins such as counterfeit coins.

SUMMARY OF THE INVENTION

It is therefore an object of the present invention to provide a coin discriminating apparatus capable of discriminating coins with high accuracy by optically detecting the pattern of obverse or reverse surfaces of the coins, even if dust and like adhere to the side surfaces thereof.

The above and other objects of the present invention can be accomplished by a coin discriminating apparatus comprising irradiating means for projecting light onto a coin, light receiving means for optically detecting light reflected by the coin, and scattering means disposed opposite to the light receiving means with respect to the coin to be irradiated with light for scattering light emitted from the irradiating means, the light receiving means receiving light reflected by the coin and light scattered by the scattering means and producing pattern data, the coin discriminating apparatus further comprising coin discriminating means for detecting a diameter of the coin based on the pattern data produced by the light receiving means, tentatively determining a denomination of the coin, and comparing the pattern data of the coin produced by the light receiving means with reference pattern data of a coin of the tentatively determined denomination.

In a preferred aspect of the present invention, the irradiating means is disposed on the side of the light receiving means with respect to the coin and the scattering means is constituted so as to irregularly reflect light emitted from the irradiating means.

In a further preferred aspect of the present invention, the irradiating means comprises first irradiating means for irradiating a lower surface of the coin with light and second irradiating means for primarily irradiating a lower surface of the scattering means with light.

In another preferred aspect of the present invention, the irradiating means comprises first irradiating means for irradiating a lower surface of the coin with light and second irradiating means disposed opposite to the light receiving means with respect to the coin for primarily irradiating an upper surface of the scattering means with light and the scattering means is constituted so as to transmit and scatter light emitted from the second irradiating means.

In a further preferred aspect of the present invention, the irradiating means comprises light emitting means for emitting light and light directing means for uniformly directing light emitted from the light emitting means onto the surface of the coin at a shallow angle.

In a further preferred aspect of the present invention, the first irradiating means comprises light emitting means for emitting light and light directing means for uniformly directing light emitted from the light emitting means onto the surface of the coin at a shallow angle.

The above and other objects and features of the present invention will become apparent from the following description made with reference to the accompanying drawings.

DESCRIPTION OF THE PREFERRED EMBODIMENTS

Figure 1:
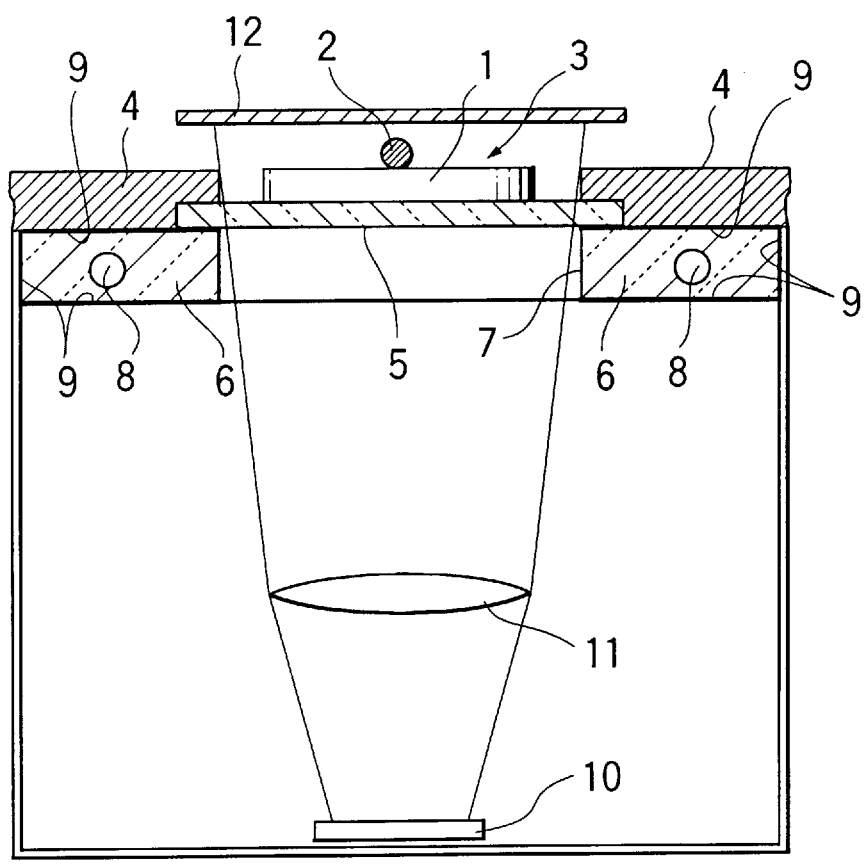
FIG. 1 is a schematic cross sectional view of a coin discriminating portion of a coin discriminating apparatus which is an embodiment of the present invention.
Figure 2:
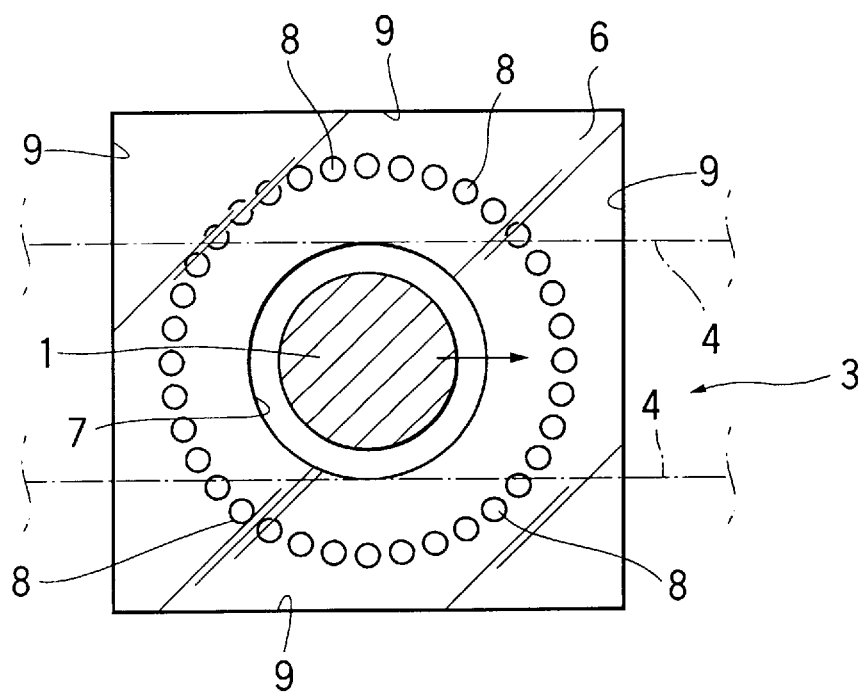
FIG. 2 is a schematic lateral cross sectional view showing a support plate.

As shown in FIG. 1, a coin 1 is pressed onto the surface of a coin passage 3 by an endless belt 2 and fed in the coin passage 3 along a pair of guide rails 4 in the direction perpendicular to a paper in FIG. 1 and the direction indicated by an arrow in FIG. 2. A part of the coin passage 3 is formed with a transparent member 5 made of glass, acrylic resin or the like through which light can transmit and a support plate 6 is provided for supporting the coin passage 3 in such a manner that it contacts the lower surface of the coin passage 3. The support plate 6 is formed by a transparent plate made of glass, acrylic resin or the like through which light can be transmitted. The support plate 6 below the transparent member 5 is formed with a hole 7 greater than the largest coin to be discriminated and equal to the distance between the pair of guide rails 4. The transparent member 5 is arranged so as to cover the hole 7.

FIG. 2 is a schematic lateral cross sectional view showing the support plate 6.

As shown in FIG. 2, a plurality of light emitting elements 8 are annularly arranged in the support plate 6 and reflection members 9 made of aluminum foil or the like are provided on the inner surfaces of side portions and upper and lower inner surfaces of the support plate 6. The hole 7 of the support plate 6 is formed by grinding.

As shown in FIG. 1, an area sensor 10 is provided below the hole 7 and a convex lens 11 is provided between the hole 7 and the area sensor 10 for converging light reflected by the coin 1 into the area sensor 10.

Light emitted from the plurality of light emitting elements 8 is repeatedly reflected by the reflection members 9 provided on the inner surfaces of side portions and upper and lower inner surfaces of the support plate 6 so as to become uniform before entering the hole 7. Since the direction of incident light is uniform and the positional relationship between the hole 7 and the coin 1 is determined as shown in FIGS. 1 and 2, light is projected onto the lower surface of the coin 1 at a shallow angle with respect to the lower surface of the coin 1.

Light projected onto and reflected by the lower surface of the coin 1 is converged by the convex lens 11 and enters an area sensor 10.

As shown in FIG. 1, a scattering member 12 is provided above the coin passage 3 on the side opposite to the area sensor 10 with respect to the coin 1 transported over the hole 7 of the support plate 6 and the surface of the scattering member 12 on the side of the hole 7 is imparted with enabling it a property to reflect and scatter light, namely, to irregularly reflect light, by applying a coating thereon or the like. The scattering member 12 is larger than the hole 7 formed in the support plate 6 and has an area sufficient for scattering most of light emitted from the plurality of light emitting elements 8 by the surface thereof.

Accordingly, light reflected from the coin 1 and incident on the surface of the scattering member 12 and light emitted from the plurality of light emitting elements 8 and directly incident on the surface of the scattering member 12 are reflected by the surface of the scattering member 12 and received by the area sensor 10. Light irregularly reflected by the surface of the scattering member 12 and received by the area sensor 10 constitutes pattern data corresponding to the background in pattern data. Since the coin 1 is present between the scattering member 12 and the area sensor 10, light irregularly reflected by the surface of the scattering member 12 on the side of the hole 7 is prevented from being mixed with light reflected by the lower surface of the coin 1 and noise is prevented from being generated in the pattern data of the lower surface of the coin 1.

A coin sensor (not shown) is provided at a portion of the coin passage 3 upstream of the support plate 6 for outputting a coin detection signal to the area sensor 10 when it detects the coin 1 so that the area sensor 10 can produce pattern data of the coin 1 based upon only light reflected by the lower surface of the coin 1 located at a predetermined position above the hole 7.

Figure 3:
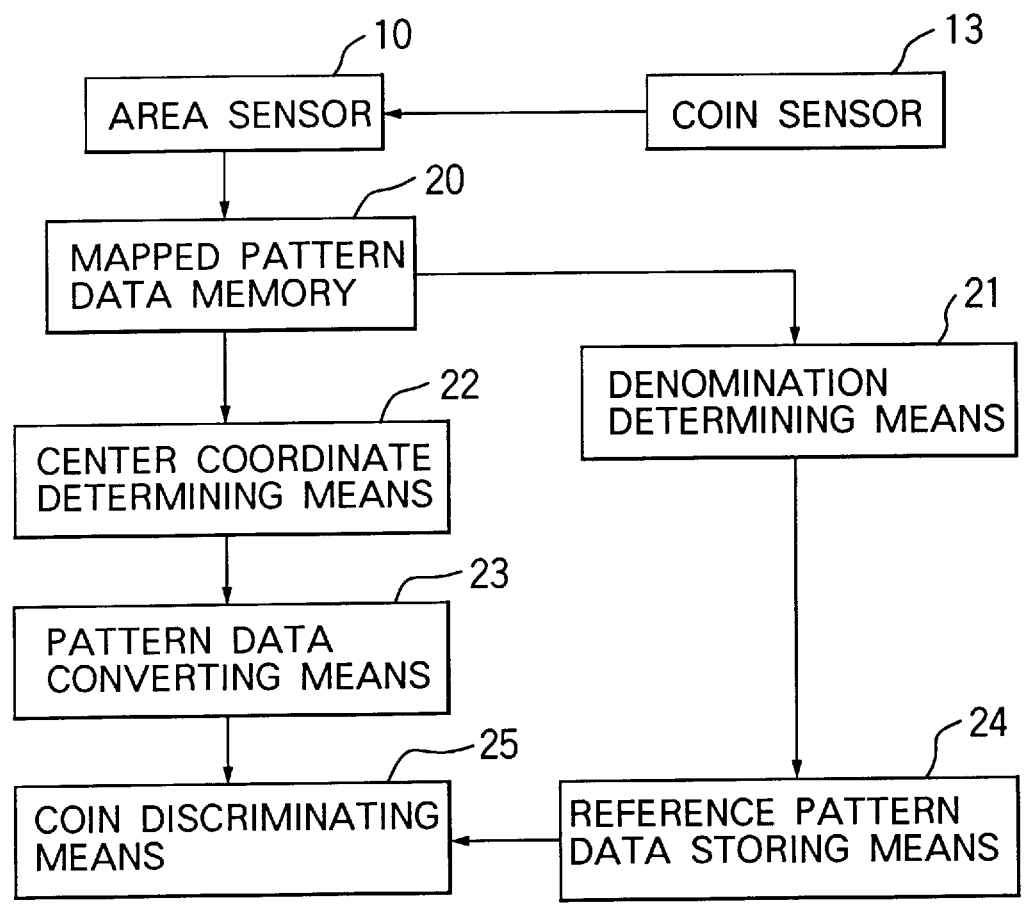
FIG. 3 is a block diagram of detection and discrimination systems of a coin discriminating apparatus which is an embodiment of the present invention.

FIG. 3 is a block diagram of the detection and discrimination systems of a coin discriminating apparatus which is an embodiment of the present invention.

As shown in FIG. 3, the detection and discrimination systems of a coin discriminating apparatus which is an embodiment of the present invention include the coin sensor 13 provided in the coin passage 3 upstream of the support plate 6 for detecting a coin 1 and outputting a coin detection signal to the area sensor 10, the area sensor 10 for detecting the lower surface pattern of the coin 1 at a predetermined timing based on the coin detection signal from the coin sensor 13 and producing pattern data, a mapped pattern data memory 20 for storing the pattern data of the coin 1 produced by the area sensor 10 as mapped into a rectangular coordinate system, namely, an x-y coordinate system, denomination determining means 21 for tentatively determining the denomination of the coin 1 based on the pattern data mapped and stored in the mapped pattern data memory 20 and outputting denomination signals, center coordinate determining means 22 for determining the center coordinate of the pattern data mapped and stored in the mapped pattern data memory 20, pattern data converting means 23 for transforming the pattern data into a polar coordinate system, namely, an r-θ coordinate system, reference pattern data storing means 24 for storing reference pattern data for each denomination of coin 1 and coin discriminating means 25 for comparing converted pattern data transformed into the r-θ coordinate system by the pattern data converting means 23 with the reference pattern data stored in the reference pattern data storing means 24 and discriminating the denomination of the coin 1, its genuineness and whether or not it is a foreign coin.

The denomination determining means 21 is constituted so as to calculate the diameter of the coin 1 based upon the pattern data mapped and stored in the mapped pattern data memory 20 and tentatively determine the denomination of the coin 1. The reference pattern data storing means 24 stores the pattern data of both surfaces of coin 1 of each denomination mapped in the r-θ coordinate system and is constituted so that in accordance with the denomination signal output from the denomination determining means 21, it can output reference pattern data of the coin 1 of the denomination corresponding thereto to the coin discriminating means 25.

Figure 4:
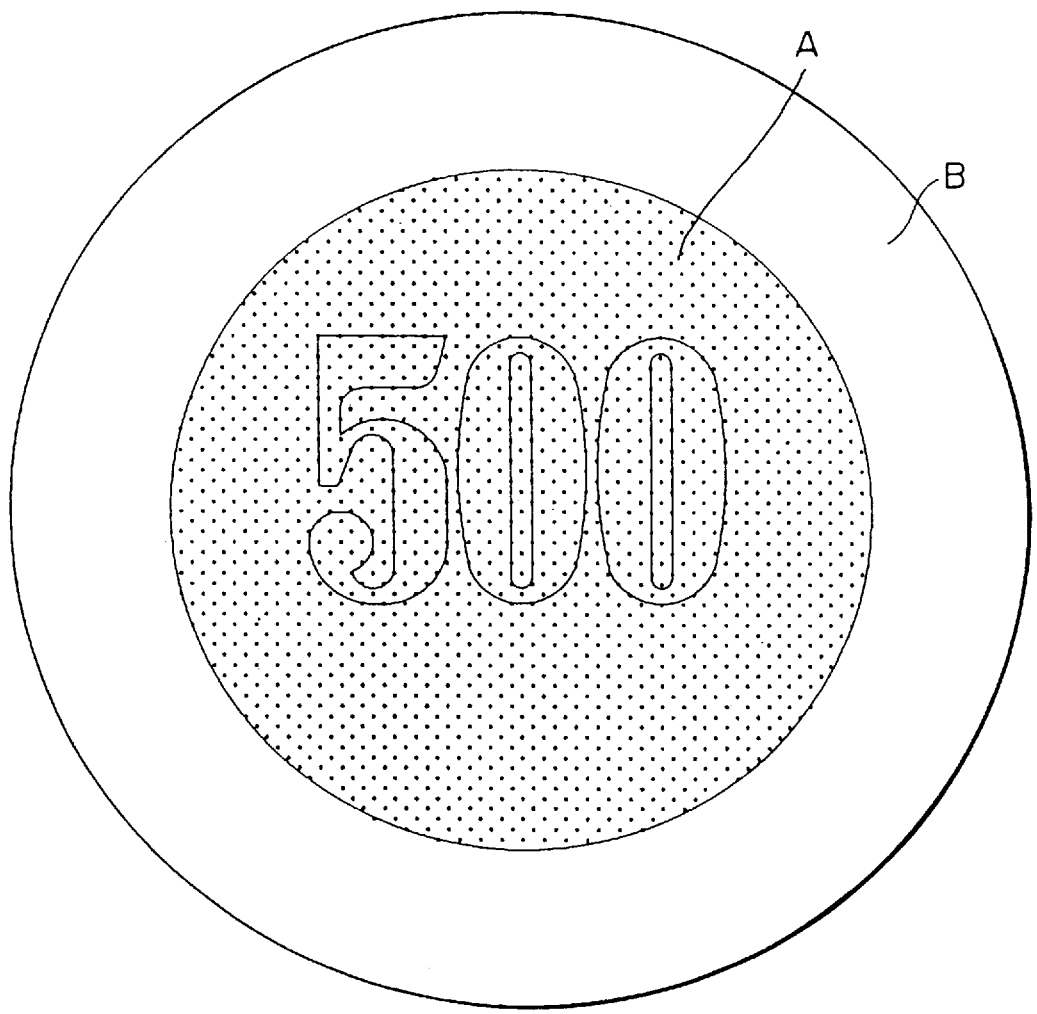
FIG. 4 is a view showing a pattern image reproduced based on pattern data mapped and stored in a mapped pattern data memory.

FIG. 4 shows one example of a pattern image reproduced based on pattern data mapped and stored in the mapped pattern data memory 20 and the pattern image is constituted by a pattern A of the lower surface of the coin 1 itself and a pattern B of the background produced by light irregularly reflected by the scattering member 12 and received by the area sensor 10. It can be seen from FIG. 4 that since the amount of light irregularly reflected by the scattering member 12 and received by the area sensor 10 is greater than the amount of light reflected by the lower surface of the coin 1 and received by the area sensor 10, the pattern B of the background is displayed as white and that density of the pattern image suddenly changes at the profile portion of the pattern A of the coin 1 itself.

Figure 5:
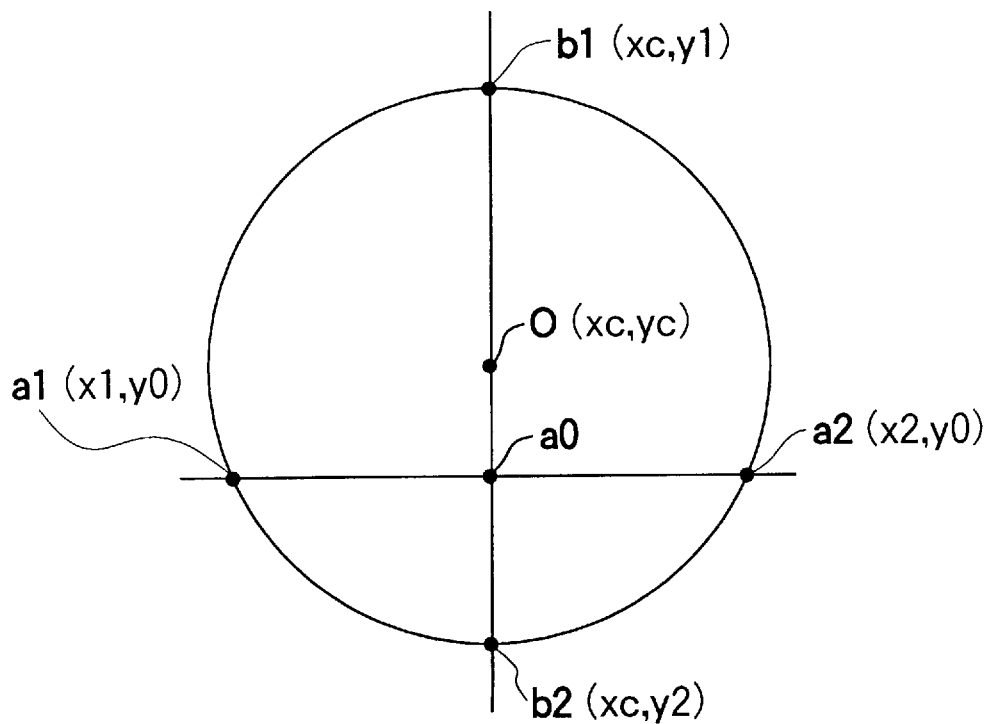
FIG. 5 is a schematic view showing a method for calculating the center coordinate of pattern data effected by center coordinate calculating means.

FIG. 5 is a schematic view showing a method for determining the center coordinate of pattern data effected by center coordinate determining means 22.

As shown in FIG. 5, the pattern data of the coin 1 produced by the area sensor 10 are mapped in the x-y coordinate system and stored in the mapped pattern data memory 20. The center coordinate determining means 22 determines x-coordinates x1 and x2 of boundary data a1 and a2 whose y-coordinate is y0 of the pattern data mapped and stored in the mapped pattern data memory 20 and determines an x-coordinate xc=(x1+x2)/2 of a center data a0 between the boundary data a1 and a2. Then, the center coordinate determining means 22 draws an imaginary straight line from the data a0 perpendicular to a straight line extending through the boundary data a1 and a2 to determine y-coordinates y1 and y2 of boundary data b1 and b2 which correspond to the points of intersection of the imaginary straight line and the boundary of the pattern data and determines a y-coordinate yc=(y1+y2)/2 of center data O between the boundary data b1 and b2. The thus determined coordinates (xc, yc) of the data O corresponds to the center coordinate of the pattern data of the coin 1 mapped in the x-y coordinate system and the data O corresponds to the data center of the pattern data of the coin 1 mapped in the x-y coordinate system.

Figure 6:
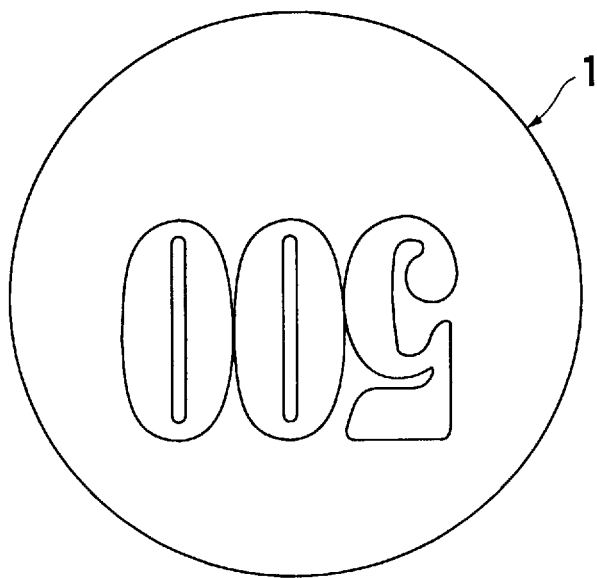
FIG. 6 is a view showing one example of pattern data of a coin produced by an area sensor and mapped and stored in a mapped pattern data memory.
Figure 7:
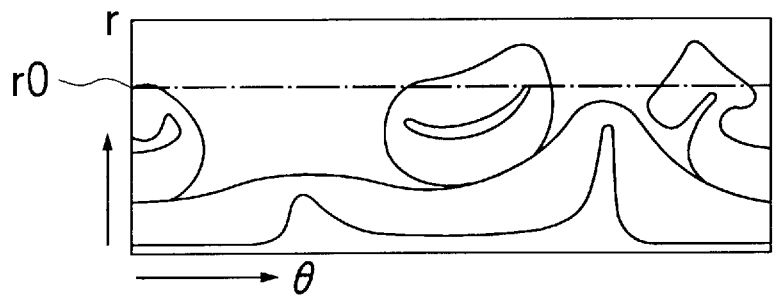
FIG. 7 is a view showing converted pattern data produced by transforming the pattern data shown in FIG. 6 into a polar coordinate system by pattern data converting means and stored in the pattern data converting means.

FIG. 6 shows one example of pattern data of a coin 1 produced by the area sensor 10 and mapped and stored in the mapped pattern data memory 20 and FIG. 7 shows converted pattern data produced in the pattern data converting means 23 by transforming the pattern data shown in FIG. 6 into an r-θ coordinate system based upon the center coordinate (xc, yc) of the pattern data of the coin 1 determined by the center coordinate determining means 22. In FIG. 7, the ordinate represents the distance r from the data center O in the x-y coordinate system and the abscissa represents an angle θ about the data center O.

The converted pattern data transformed into the r-θ coordinate system by the pattern data converting means 23 in this manner are input to the coin discriminating means 25. On the other hand, a denomination signal produced by the denomination determining means 21 is input to the reference pattern data storing means 24. In response, the reference pattern data storing means 24 selects the reference pattern data of the denomination corresponding to the denomination signal from among the reference pattern data of coins mapped in the r-θ coordinate system and stored therein and outputs it to the coin discriminating means 25.

Figure 8:
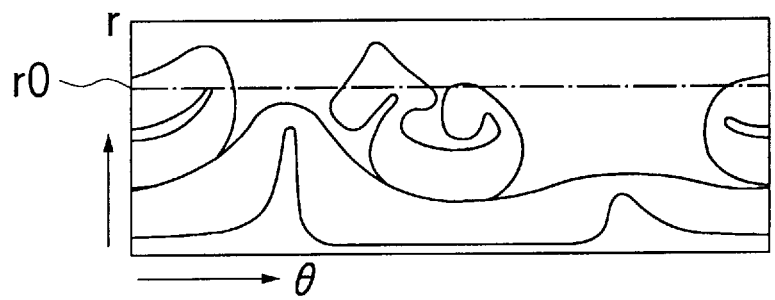
FIG. 8 is a view showing reference pattern data of the coin shown in FIG. 6.

FIG. 8 shows the reference pattern data of the coin 1 shown in FIG. 6 and mapped in the r-θ coordinate system. This data corresponds to the converted pattern data shown in FIG. 7. Since the converted pattern data shown in FIG. 7 is obtained in the pattern data converting means 23 by transforming the pattern data in the x-y coordinate system into the r-θ coordinate system based on the center coordinates (xc, yc) of the pattern data of the coin 1 determined by the center coordinate determining means 22, the zero point of the ordinate, namely, the zero point of the r-axis coincides with the zero point of the reference pattern data shown in FIG. 8. However, since the orientation of the coin 1 to be discriminated is usually offset angularly (rotationally) from that of the coin 1 used for producing the reference pattern data, the pattern data at the same θ value in FIGS. 7 and 8 are normally obtained from different portions of the coin 1. Accordingly, it is impossible to discriminate the denomination of the coin 1, its genuineness and the like by directly comparing the converted pattern data in FIG. 7 and the reference pattern data in FIG. 8 and, therefore, it is necessary to correct the converted pattern data prior to the comparison so that the zero point of the converted pattern data in the θ axis coincides with the zero point of the reference pattern data in the θ axis.

In view of the above, the coin discriminating means 25 reads the pattern data values at a predetermined distance r0 from the data center of the converted pattern data shown in FIG. 7, namely, reads the pattern data values whose ordinate values are equal to a predetermined value r0 over 360 degrees, and reads the pattern data values at a predetermined distance r0 from the data center of the reference pattern data shown in FIG. 8, namely, reads the pattern data values whose ordinate values are equal to a predetermined value r0 over 360 degrees. Then, the coin discriminating means 25 compares the two sets of pattern data values, thereby correcting the deviation of the converted pattern data in the θ axis caused by the angular offset of the coin 1.

Figure 9:
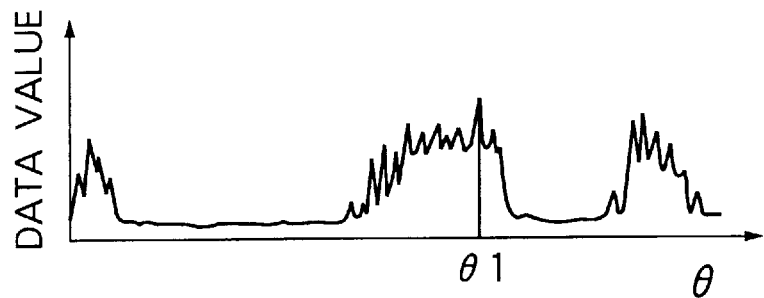
FIG. 9 is a graph showing pattern data values obtained by reading the converted pattern data shown in FIG. 7 over 360 degrees at a predetermined distance r0 from a data center.
Figure 10:
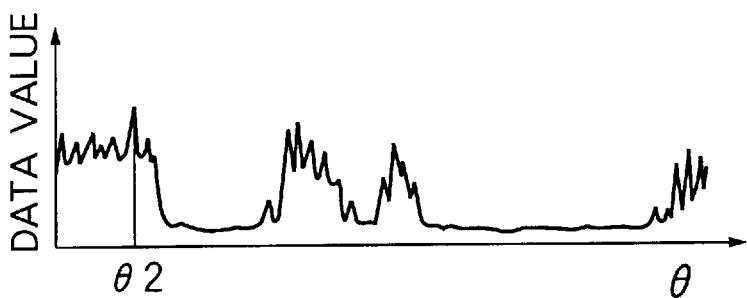
FIG. 10 is a graph showing pattern data value obtained by reading reference pattern data shown in FIG. 8 over 360 degrees at a predetermined distance r0 from the data center.

FIG. 9 is a graph showing pattern data values obtained by reading the converted pattern data shown in FIG. 7 over 360 degrees at a predetermined distance r0 from the data center and FIG. 10 is a graph showing pattern data values obtained by reading reference pattern data shown in FIG. 8 over 360 degrees at a predetermined distance r0 from the data center. In FIGS. 9 and 10, the ordinate represents data values and the abscissa represents the angle θ.

Coins 1 are fed through the coin passage 3 guided by the pair of guide rails 4 and, therefore, the center of the coin 1 passes along a predetermined locus on the transparent member 5. On the contrary, the coin 1 is usually offset angularly from the coin used to produce the reference pattern data. Therefore, since the sets of pattern data at the same θ value in FIGS. 7 and 8 are normally obtained from different portions of the coin 1, it is necessary to correct the converted pattern data prior to the comparison so that the zero point of the converted pattern data in the θ axis coincides with the zero point of the reference pattern data in the θ axis.

Figure 11:
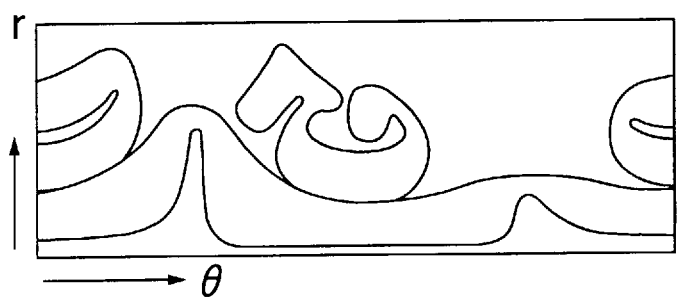
FIG. 11 is a view showing converted pattern data after remapping.

Accordingly, the coin discriminating means 25 obtains θ values θ1 and θ2 at which the pattern data value shown in FIG. 9 and the reference pattern data value shown in FIG. 10 are maximum respectively and remaps the converted pattern data shown in FIG. 7 so that θ1 becomes equal to θ2. FIG. 11 shows the thus remapped converted pattern data.

The coin discriminating means 25 compares the converted pattern data remapped in the above described manner and shown in FIG. 11 with the reference pattern data shown in FIG. 10 and discriminates the denomination of the coin 1, its genuineness and whether or not it is a foreign coin, in accordance with of how well the converted pattern data coincides with the reference pattern data.

The thus constituted coin discriminating apparatus which is an embodiment of the present invention discriminates coins in the following manner.

First, when a coin 1 is fed through the coin passage 3 and the coin 1 reaches the support plate 6, light is projected onto the lower surface of the coin 1 from the plurality of light emitting elements 8. The emitted light is reflected by the lower surface of the coin 1 and is focused by the convex lens 11 to enter the area sensor 10. Since the plurality of light emitting elements 8 are arranged in the transparent support plate 6 and the hole 7 of the support plate 6 is arranged immediately below the coin 1 to be discriminated such that the circumferential surfaces thereof are positioned outside of the coin 1 to be discriminated, light is projected onto the lower surface of the coin 1 at a shallow angle with respect to the lower surface of the coin 1 and light is reflected by the lower surface of the coin 1 in accordance with the surface irregularities constituting the pattern thereof and is received by the area sensor 10.

Light reflected by the coin 1 and impinging on the lower surface of the scattering member 12 on the side of the hole 7 and light directly impinging on the lower surface of the scattering member 12 on the side of the hole 7 from the plurality of light emitting elements 8 are irregularly reflected by the lower surface of the scattering member 12 on the side of the hole 7 and most of the light is received by the area sensor 10.

When a coin detection signal is input from the coin sensor 13, the area sensor 10 produces pattern data in accordance with the intensity of received light, namely, the pattern irregularities of the lower surface of the coin 1. Since the reflection members 9 are provided on the inner surfaces of side portions and upper and lower inner surfaces of the support plate 6, light is uniformly emitted from the support plate 6 with uniform intensity and reflected by the lower surface of the coin 1. Therefore, if the denomination is the same, the same pattern data will be produced by the area sensor 10.

Light irregularly reflected by the lower surface of the scattering member 12 on the side of the hole 7 is received by the area sensor 10 without being mixed with light reflected by the lower surface of the coin 1 since the coin 1 is present between the scattering member 12 and the area sensor 10. Light reflected by the lower surface of the scattering member 12 on the side of the hole 7 and received by the area sensor 10 forms pattern data corresponding to the background other than the image of the lower surface of the coin 1 and since light impinges on the lower surface of the scattering member 12 on the side of the hole 7 at an angle close to the perpendicularity, most of the light is received by the area sensor 10. Therefore, the signal intensity of pixels of the pattern data corresponding to the background produced by the area sensor 10 is greater than that of the pattern data of the lower surface of the coin 1 and the background is displayed as white when an image is reproduced.

The pattern data produced by the area sensor 10 is mapped in the x-y coordinate system and stored in the mapped pattern data memory 20. FIG. 6 shows one example of pattern data of a coin 1 produced by the area sensor 10 and mapped and stored in the mapped pattern data memory 20.

The denomination determining means 21 calculates the outer diameter of the coin 1 based on the pattern data of the coin 1 mapped in the x-y coordinate system and stored in the mapped pattern data memory 20 and tentatively determines the denomination of the coin 1, thereby producing a denomination signal and outputting it to the reference pattern data storing means 24. Since the signal intensity of each pixel constituting the pattern data corresponding to the background and produced by light irregularly reflected by the lower surface of the scattering member 12 on the side of the hole 7 and received by the area sensor 10 is greater than that of the pattern data of the slower surface of the coin 1 and the background is displayed as white when an image is reproduced, the signal intensity of pixels suddenly changes at a data region corresponding to the profile portion of the lower surface of the coin 1. Therefore, even when dust and like adhere to the side surface of the coin 1, the denomination determining means 21 can accurately detect the diameter of the coin 1 and tentatively determine the denomination of the coin 1 based on the pattern data mapped in the x-y coordinate system and stored in the mapped pattern data memory 20.

On the other hand, the center coordinate determining means 22 determines the center coordinates (xc, yc) of the pattern data of the coin 1 based upon the pattern data of the coin 1 mapped in the x-y coordinate system and stored in the mapped pattern data memory 20 and outputs it to the pattern data converting means 23.

Based on the center coordinates (xc, yc) of the pattern data of the coin 1 input from the center coordinate determining means 22, the pattern data converting means 23 transforms the pattern data of the coin 1 mapped in the x-y coordinate system and stored in the mapped pattern data memory 20 into an r-$\theta$ coordinate system. FIG. 7 shows the converted pattern data thus transformed into the r-$\theta$ coordinate system.

Based upon the denomination signal input from the denomination determining means 21, the reference pattern data storing means 24 selects the reference pattern data of the reverse surface of the coin 1 corresponding to the denomination from among the reference pattern data mapped into the r-$\theta$ coordinate system and stored therein and outputs it to the coin discriminating means 25. FIG. 8 shows one example of the reference pattern data output from the reference pattern data storing means 24 to the coin discriminating means 25.

Since the pattern data cannot be produced by the area sensor 10 with the coin 1 in a predetermined angular orientation and the coin 1 is normally offset angularly from the coin 1 used for producing the reference pattern data, as is clear from FIGS. 7 and 8, the converted pattern data is normally offset along the abscissa, namely, the $\theta$ axis, with respect to the reference pattern data. Therefore, it is necessary to correct the deviation of the converted pattern data in the $\theta$ direction and discriminate the coin 1 by comparing the converted pattern data with the reference pattern data.

Accordingly, the coin discriminating means 25 reads the pattern data values of the converted pattern data shown in FIG. 7 over 360 degrees whose ordinate values are equal to a predetermined value r0 and reads the pattern data values of the reference pattern data shown in FIG. 8 over 360 degrees whose ordinate values are equal to a predetermined value r0.

FIGS. 9 and 10 are graphs obtained by plotting the thus read converted pattern data values and reference pattern data values whose ordinate values are equal to a predetermined value r0. The coin discriminating means 25 further calculates $\theta$ values at which the converted pattern data values and the reference pattern data values become maximum respectively. The thus obtained $\theta$ value is $\theta 1$ in FIG. 9 and the $\theta$ value is $\theta 2$ in FIG. 10.

When $\theta 1$ and $\theta 2$ are obtained in this manner, the coin discriminating means 25 remaps the converted pattern data so that $\theta 1$ becomes equal to $\theta 2$. FIG. 11 shows an example of the converted pattern data thus remapped by the coin discriminating means 25. Since the deviation of the converted pattern data in the direction caused by the angular offset of the coin 1 has been corrected by remapping the converted pattern data, it is possible for the coin discriminating means 25 to discriminate whether the denomination of the coin 1 coincides with that tentatively determined by the denomination determining means 21, its genuineness and whether or not it is a foreign coin by pattern matching the converted pattern data with the reference pattern data.

However, since it is impossible to feed the coin 1 so that one surface thereof always faces upward, if the coin is fed in such a manner that the reverse surface faces upward, the remapped converted pattern data never coincides with the reference pattern data of the reverse surface of the coin 1 of the denomination tentatively determined by the denomination determining means 21. Therefore, when the remapped converted pattern data does not coincide with the reference pattern data of the reverse surface of the coin 1 of the denomination selected in accordance with the denomination signal input from the denomination determining means 21, if the coin 1 is immediately discriminated as a counterfeit coin or a foreign coin, the coin discrimination accuracy is degraded.

Accordingly, in this embodiment, the converted pattern data is first compared with the reference pattern data of the reverse surface of the coin 1 of the denomination tentatively determined by the denomination determining means 21 and if they do not coincide, the converted pattern data is compared with the reference pattern data of the obverse surface of the coin 1 of the denomination in the same manner, thereby discriminating whether the denomination of the coin 1 coincides with that tentatively determined by the denomination determining means 21, its genuineness and whether or not it is a foreign coin.

According to this embodiment, the pattern data corresponding to the background in a pattern image are produced by receiving light reflected and scattered, namely, irregularly reflected by the scattering member 12 and mapped in the x-y coordinate system and stored in the mapped pattern data memory 20. Since the signal intensity of pixels constituting these pattern data is greater than that of the pattern data corresponding to the coin 1 itself, the signal intensity of the pixels in the pattern data suddenly changes at a data region corresponding to the profile portion of the coin 1. Therefore, even in the case where dust and the like adhere to the side surface of the coin 1, since the denomination determining means 21 can accurately detect the diameter of the coin 1 based on the pattern data mapped in the x-y coordinate system and stored in the mapped pattern data memory 20 and tentatively determine the denomination of the coin 1, it is possible to prevent the denomination determining means 21 from making on erroneous tentative determination of the denomination of the coin 1 due to dust and the like adhering to the side surface of the coin 1 and the coin discriminating means 25 from erroneously discriminating the coin 1 by comparing the pattern data of the lower surface of the coin 1 with erroneous reference data.

Figure 12:
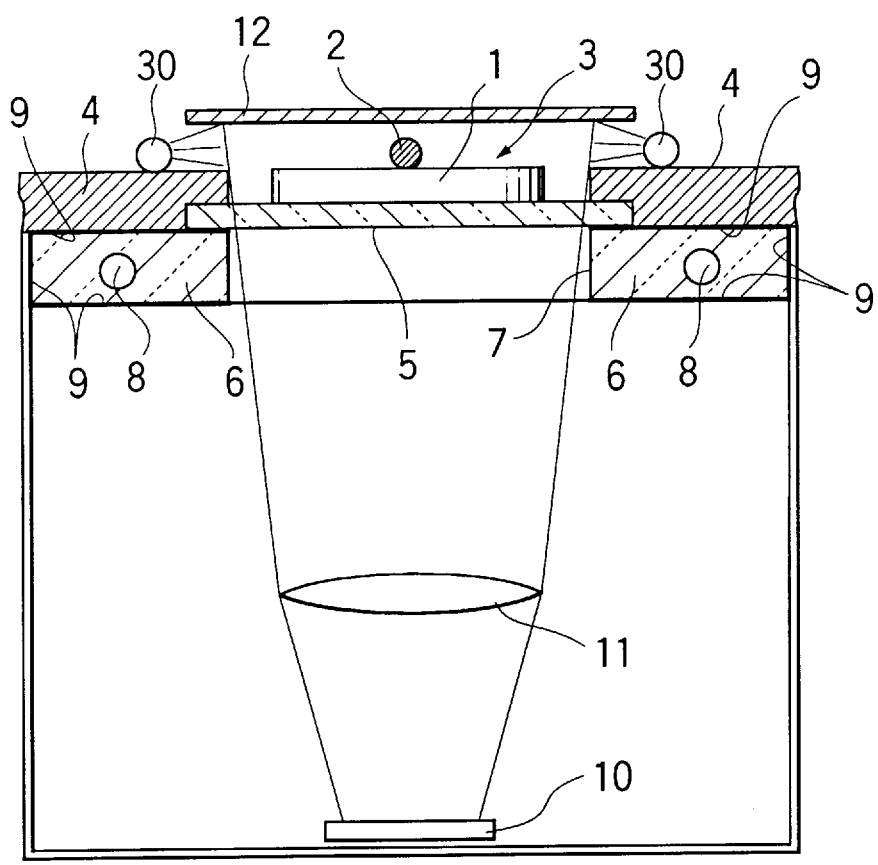
FIG. 12 is a schematic perspective view of a coin discriminating apparatus which is another embodiment of the present invention.

FIG. 12 is a schematic perspective view of a coin discriminating apparatus which is another embodiment of the present invention.

As shown in FIG. 12, the coin discriminating apparatus according to this embodiment includes light emitting elements 30 provided on the guide rails 4 along the coin passage 3 for exclusively irradiating the scattering member 12 with light in addition to the plurality of light emitting elements 8 disposed in the support plate 6. Other aspects of the configuration are the same as those of the embodiment shown in FIGS. 1 to 11. The light emitting elements 30 are disposed at positions so that light emitted therefrom cannot directly enter the area sensor 10.

According to the above described embodiment, since the light emitting elements 30 are provided for exclusively irradiating the scattering member 12 with light in addition to the plurality of light emitting elements 8, the amount of light irregularly reflected by the surface of the scattering member 12 on the side of the hole 7 and received by the area sensor 10 can be increased. Therefore, since the signal intensity of pixels of the pattern data corresponding to the background in a pattern image can be further increased and change in the signal intensity at a data region corresponding to the profile portion of the coin 1 can be further increased, even in the case where dust and the like adhere to the side surface of the coin 1, the denomination determining means 21 can accurately tentatively determine the denomination of the coin 1 based on the diameter of the coin 1.

Figure 13:
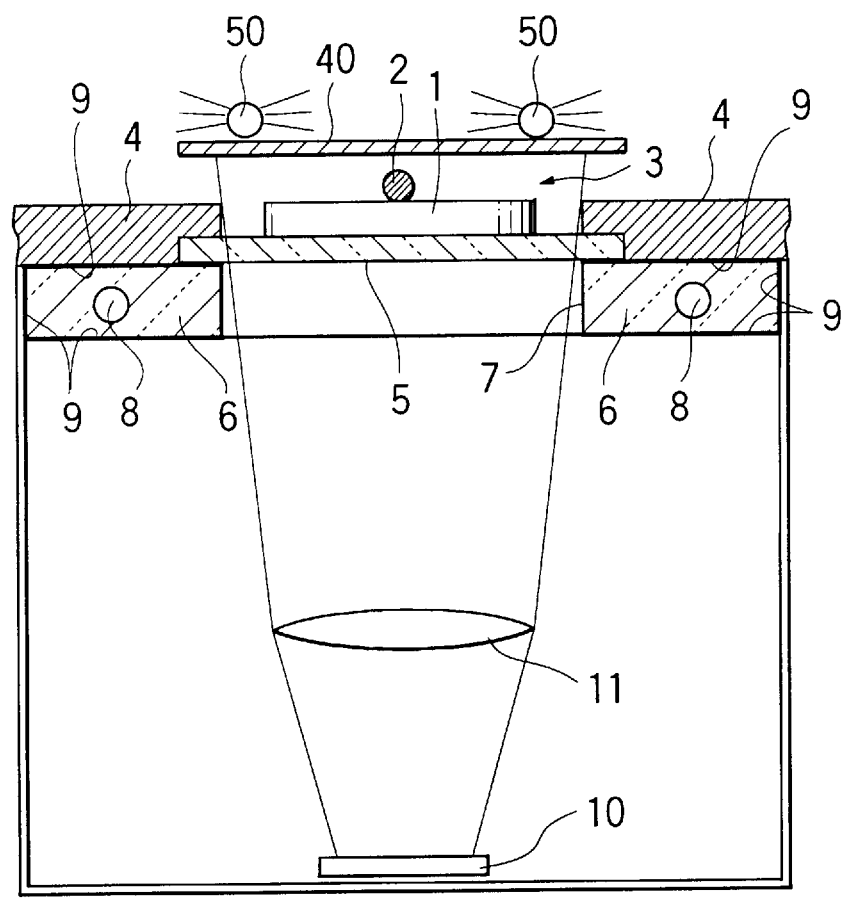
FIG. 13 is a schematic perspective view of a coin discriminating apparatus which is a further embodiment of the present invention.

FIG. 13 is a schematic perspective view of a coin discriminating apparatus which is a further embodiment of the present invention.

As shown in FIG. 13, the coin discriminating apparatus according to this embodiment includes a scattering member 40 for transmitting and scattering light instead of the scattering member 12 for irregularly reflecting light by the surface thereof on the side of the hole 7, and light emitting elements 50 disposed above the scattering member 40 for irradiating the upper surface of the scattering member 40 with light. Other aspects of the configuration are the same as those of the embodiment shown in FIGS. 1 to 11.

According to this embodiment, since the light emitting elements 50 are provided for exclusively irradiating the scattering member 40 with light from the opposite side of the area sensor 10 in addition to the plurality light emitting elements 8 and the area sensor 10 receives light transmitted through and scattered by the scattering member 40, the amount of light scattered by the scattering member 40 and received by the area sensor 10 can be increased by adjusting the amount of light emitted from the light emitting elements 50. Therefore, since the signal intensity of pixels in the pattern data corresponding to the background in a pattern image can be further increased, thereby further increasing change in the signal intensity at a data region corresponding to the profile portion of the coin 1, even in the case where dust and the like adhere to the side surface of the coin 1, the denomination determining means 21 can accurately tentatively determine the denomination of the coin 1 based on the diameter of the coin 1. Moreover, since the light emitting elements 50 are disposed on the opposite side to the scattering member 40 with respect to the area sensor 10 and the area sensor 10 is constituted so as to receive light transmitted through and scattered by the scattering member 40, the degree of freedom in disposing the light emitting elements 50 is increased and a desired amount of light transmitted through and scattered by the scattering member 40 can be received by the area sensor 10. Therefore, since change in the signal intensity at a data region corresponding to the profile portion of the coin 1 can be adjusted in a desired manner, the denomination determining means 21 can more accurately tentatively determine the denomination of the coin 1 based on the diameter of the coin 1.

The present invention has thus been shown and described with reference to specific embodiments. However, it should be noted that the present invention is in no way limited to the details of the described arrangements but changes and modifications may be made without departing from the scope of the appended claims.

For example, in the above described embodiments, the deviation of the converted pattern data caused by the angular offset of the coin 1 is corrected by obtaining the θ values θ1 and θ2 at which the data values of the converted pattern data and the reference pattern data whose ordinate values are equal to r0 become maximum and remapping the converted pattern data so that θ1 becomes equal to θ2. However, depending upon the kind of coins, the data values of the reference pattern data whose ordinate values are equal to a predetermined value r0 may have the maximum value plus a plurality of values whose magnitudes are close to the maximum value. In such a case, the coin discriminating means 25 may make erroneous judgment because a data value which is not maximum was mistakenly detected as the maximum value, in which case the deviation of the converted pattern data in the θ direction caused by the angular offset of the coin 1 will not be corrected even if the converted pattern data are remapped. As a result, the coin will not be correctly discriminated. For preventing such erroneous discrimination, it is possible to discriminate the coin 1 by remapping the converted pattern data No times (No being an integer not smaller than 2) based on the data values in order from greater data value to smaller data value.

Further, in the above described embodiments, instead of obtaining θ values θ1 and θ2 at which the data values of the converted pattern data and the reference pattern data whose ordinate values are equal to r0 become maximum, the square of the difference between the data values of the converted pattern data and the reference pattern data whose ordinate values are equal to a predetermined value r0 can be integrated over the range from 0 to 360 degrees of the θ value to obtain an integrated value and the graph of the data values of the converted pattern data shown in FIG. 9 be moved in parallel with the θ axis. When the thus calculated integrated value becomes minimum, it can be judged that the deviation of the converted pattern data caused by the angular offset of the coin 1 is corrected and the converted pattern data can be remapped to be compared with the reference data, thereby discriminating the coin 1. Moreover, the difference between the data values of the converted pattern data and the reference pattern data whose ordinate values are equal to a predetermined value r0 can be integrated over the range from 0 to 360 degrees of the θ value to obtain an integrated value and the graph of the data values of the converted pattern data shown in FIG. 9 be moved in parallel with the θ axis. When the thus calculated integrated value becomes minimum, it can be judged that the deviation of the converted pattern data caused by the angular offset of the coin 1 is corrected and the converted pattern data can be remapped to be compare with the reference data, thereby discriminating the coin 1.

Furthermore, in the above described embodiments, although the area sensor 10 is used as a sensor for detecting light reflected by the back surface of a coin 1, other types of sensors such as a line sensor may be used instead.

Moreover, in the above described embodiments, the light emitting elements 8, 30, 50 always emit light and the area sensor 10 receives the light reflected by the coin 1 positioned above the hole 7 and produce pattern data at a predetermined time determined by a coin detection signal output by the coin sensor 13 when it detects the coin 1. However, the coin sensor 13 may be caused to output a coin detection signal to means for controlling the light emitting elements 8 when it detects a coin 1, thereby causing the light emitting elements 8, 30, 50 to emit light at a predetermined time and the area sensor 10 to receive the light.

Furthermore, in the above described embodiments, although the reflection members 9 are provided on the inner surfaces of the side portions and the upper and lower inner surfaces of the transparent support plate 6, the reflection members 9 may be provided at different portions depending upon the characteristics of the light emitting elements 8.

Further, in the above described embodiments, although each of the coin discriminating apparatuses is provided with a single scattering member 12, 40, since it is not absolutely necessary to provide any scattering member behind the coin 1 with respect to the area sensor 10, a pair of scattering members may be disposed along the guide rails 4 so as to irregularly reflect most of light emitted from the light emitting elements 8, 30 toward the area sensor 10 in the embodiments shown in FIGS. 1 to 11 and 12 or a pair of scattering members may be disposed along the guide rails 4 so as to transmit and scatter light emitted from the light emitting elements 50 toward the area sensor 10 in the embodiment shown in FIG. 13.

Moreover, in the above described embodiments, the converted pattern data is first compared with the reference pattern data of the reverse surface of the coin 1 of the denomination tentatively determined by the denomination determining means 21 and if they do not coincide, the converted pattern data is compared with the reference pattern data of the obverse surface of the coin 1 of the denomination in the same manner, thereby discriminating whether the denomination of the coin 1 coincides with that tentatively determined by the denomination determining means 21, its genuineness and whether or not it is a foreign coin. However, the converted pattern data can be first compared with the reference pattern data of the obverse surface of the coin 1 of the denomination tentatively determined by the denomination determining means 21 and if they do not coincide, the converted pattern data can be compared with the reference pattern data of the reverse surface of the coin 1 of the denomination in the same manner, thereby discriminating whether the denomination of the coin 1 coincides with that tentatively determined by the denomination determining means 21, its genuineness and whether or not it is a foreign coin.

Further, in this specification and the appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

According to the present invention, it is possible to provide a coin discriminating apparatus capable of discriminating coins with high accuracy by optically detecting the pattern of obverse or reverse surfaces of the coins, even if dust and like adhere to the side surfaces thereof.

We claim:

1. A coin discriminating apparatus comprising irradiating means for projecting light onto a coin, light receiving means for optically detecting light reflected by the coin, and scattering means, disposed on an opposite side of the coin from the light receiving means, to be irradiated with light for scattering light emitted from the irradiating means, the light receiving means receiving light reflected by the coin and light scattered by the scattering means and producing pattern data therefrom, the amount of light scattered by the scattering means and received by the light receiving means being greater than the amount of light reflected by the coin and received by the light receiving means, the coin discriminating apparatus further comprising coin discriminating means for detecting a diameter of the coin based on the pattern data produced by the light receiving means, tentatively determining a denomination of the coin, and comparing the pattern data of the coin produced by the light receiving means with reference pattern data of a coin of the tentatively determined denomination.

2. A coin discriminating apparatus in accordance with claim 1 wherein the irradiating means is disposed on the side of the light receiving means with respect to the coin and the scattering means is constituted so as to irregularly reflect light emitted from the irradiating means.

3. A coin discriminating apparatus in accordance with claim 2 wherein the irradiating means comprises first irradiating means for irradiating a lower surface of the coin with light and second irradiating means for primarily irradiating a lower surface of the scattering means with light.

4. A coin discriminating apparatus in accordance with claim 1 wherein the irradiating means comprises first irradiating means for irradiating a lower surface of the coin with light and second irradiating means disposed opposite to the light receiving means with respect to the coin for primarily irradiating an upper surface of the scattering means with light and the scattering means is constituted so as to transmit and scatter light emitted from the second irradiating means.

5. A coin discriminating apparatus in accordance with claim 1 wherein the irradiating means comprises light emitting means for emitting light and light directing means for uniformly directing light emitted from the light emitting means onto the surface of the coin at a shallow angle.

6. A coin discriminating apparatus in accordance with claim 2 wherein the irradiating means comprises light emitting means for emitting light and light directing means for uniformly directing light emitted from the light emitting means onto the surface of the coin at a shallow angle.

7. A coin discriminating apparatus in accordance with claim 3 wherein the first irradiating means comprises light emitting means for emitting light and light directing means for uniformly directing light emitted from the light emitting means onto the surface of the coin at a shallow angle.

8. A coin discriminating apparatus in accordance with claim 4 wherein the first irradiating means comprises light emitting means for emitting light and light directing means for uniformly directing light emitted from the light emitting means onto the surface of the coin at a shallow angle.

9. A coin discriminating apparatus comprising irradiating means for projecting light onto a coin, light receiving means for optically detecting light reflected by the coin, and scattering means disposed on an opposite side of the coin from the light receiving means, to be irradiated with light for scattering light emitted from the irradiating means, the light receiving means receiving light reflected by the coin and light scattered by the scattering means and producing pattern data therefrom, the coin discriminating apparatus further comprising coin discriminating means for detecting a diameter of the coin based on the pattern data produced by the light receiving means, tentatively determining a denomination of the coin, and comparing the pattern data of the coin produced by the light receiving means with reference pattern data of a coin of the tentatively determined denomination;

wherein the irradiating means is disposed on the side of the light receiving means with respect to the coin and the scattering means is constituted so as to irregularly reflect light emitted from the irradiating means; and wherein the irradiating means comprises first irradiating means for irradiating a lower surface of the coin with light and second irradiating means for primarily irradiating a lower surface of the scattering means with light.

10. A coin discriminating apparatus in accordance with claim 9 wherein the first irradiating means comprises light emitting means for emitting light, and light directing means for uniformly directing light emitted from the light emitting means onto the surface of the coin at a shallow angle.

11. A coin discriminating apparatus comprising irradiating means for projecting light onto a coin, light receiving means for optically detecting light reflected by the coin, and scattering means disposed on an opposite side of the coin from the light receiving means, to be irradiated with light for scattering light emitted from the irradiating means, the light receiving means receiving light reflected by the coin and light scattered by the scattering means and producing pattern data therefrom, the coin discriminating apparatus further comprising coin discriminating means for detecting a diameter of the coin based on the pattern data produced by the light receiving means, tentatively determining a denomination of the coin, and comparing the pattern data of the coin produced by the light receiving means with reference pattern data of a coin of the tentatively determined denomination;

wherein the irradiating means comprises first irradiating means for irradiating a lower surface of the coin with light and second irradiating means disposed opposite to the light receiving means with respect to the coin for primarily irradiating an upper surface of the scattering means with light and the scattering means is constituted so as to transmit and scatter light emitted from the second irradiating means.

12. A coin discriminating apparatus in accordance with claim 11 wherein the first irradiating means comprises light emitting means for emitting light and light directing means for uniformly directing light emitted from the light emitting means onto the surface of the coin at a shallow angle.

\* \* \* \* \*